United States Patent [19]
Stern

[11] 4,015,439
[45] Apr. 5, 1977

[54] COOLING PROCESS FOR SUBAMBIENT AND ABOVE AMBIENT TEMPERATURES

[75] Inventor: Sidney Simon Stern, New York, N.Y.

[73] Assignee: Stauffer Chemical Company, Westport, Conn.

[22] Filed: June 2, 1975

[21] Appl. No.: 583,345

[52] U.S. Cl. .................................. 62/114; 62/115; 62/498

[51] Int. Cl.² .......................................... F25B 1/00

[58] Field of Search ............ 62/119, 114, 115, 514, 62/498

[56] References Cited

UNITED STATES PATENTS

| | | |
|---|---|---|
| 1,781,051 | 11/1930 | Carrier .............................. 62/114 |
| 2,083,611 | 6/1937 | Marshall ............................. 62/119 |
| 2,226,797 | 12/1940 | Andersson ........................... 62/119 |
| 3,882,689 | 5/1975 | Rogers ............................... 62/115 |
| R23,358 | 4/1951 | Reed et al. .......................... 62/114 |

Primary Examiner—Lloyd L. King
Attorney, Agent, or Firm—Ellen P. Trevors; Daniel S. Ortiz

[57] ABSTRACT

The present invention relates to the provision for cooling in systems where above ambient cooling temperatures are indicated, for at least certain system services, while water as a coolant therein is contraindicated.

8 Claims, 2 Drawing Figures

COOLING PROCESS FOR SUBAMBIENT AND ABOVE AMBIENT TEMPERATURES

BACKGROUND OF THE INVENTION

Cooling requirements are a major factor in today's industrial chemical process operations. Typically, with due regard for cost and safety factors, where cooling below ambient temperature is required, a system is employed using a volatile refrigerant whereby heat from a process reactor is absorbed at a low temperature by vaporization in an evaporator at low pressure. This heat is then dissipated at higher temperature and higher pressure by condensation heat transfer in a condenser. The pressure difference rendering such a system operable is supplied by a compressor. Where cooling to a temperature level above ambient is suitable or required, water is employed as a coolant and may be used on a flow through or recirculation basis, depending on demand, availability, etc., the latter type use requiring facilities to cool the water.

While water is a suitable coolant for many applications, there are numerous chemical process operations where its use can prove extremely hazardous. Certain chemical process constituents react with water violently or in such a fashion that dangerously corrosive products are formed. Since coolant leakage cannot be totally prevented, such reactions frequently occur when water is used as a cooling medium.

It is an object of the present invention to provide a novel method of cooling at above ambient temperatures whereby certain hazards inherent in existing systems are obviated. More specifically, it is an object of the invention to provide a novel method of cooling at above ambient temperatures without the use of water.

Another object of the invention is to provide a virtually hazard free method of cooling at above ambient temperatures which has a favorable cost comparison to conventional processes.

It is a further object of the invention to provide a method whereby economical and virtually hazard free above ambient cooling is achieved in integral relation with the simultaneous provision of below ambient cooling.

SUMMARY OF THE INVENTION

These objectives are achieved in particular embodiments whereby the method can be practiced.

Certain objectives of the invention are achieved in a closed system wherein an appropriate liquid refrigerant, collected in an accumulation reservoir at a temperature and pressure which will permit its vaporization to achieve an above ambient cooling temperature, is supplied to an evaporator or evaporators disposed in appropriate relation to a chemical process vessel or vessels such that the vessels will be cooled thereby. Cooling is supplied by absorption of heat and consequent vaporization of the refrigerant. Compression not being required, the refrigerant vapor is passed to a condenser wherein the vapor is condensed. The liquid effluent is then returned to the accumulation reservoir at an appropriate temperature and pressure as indicated above. Certain other objectives of the invention are achieved in a system as described above which additionally comprises, in integral relation therewith, means for providing cooling at below ambient temperature by a vapor-compression cycle. This particular embodiment of the invention employs a refrigerant reservoir, refrigerant condenser and refrigerant supply which are common to the above ambient and below ambient cooling zones employed in practicing the method of the invention.

BRIEF DESCRIPTION OF THE DRAWINGS

The present invention will be more clearly understood from the following detailed description of various embodiments together with the drawings wherein.

DETAILED DESCRIPTION OF THE INVENTION

Figure 1:
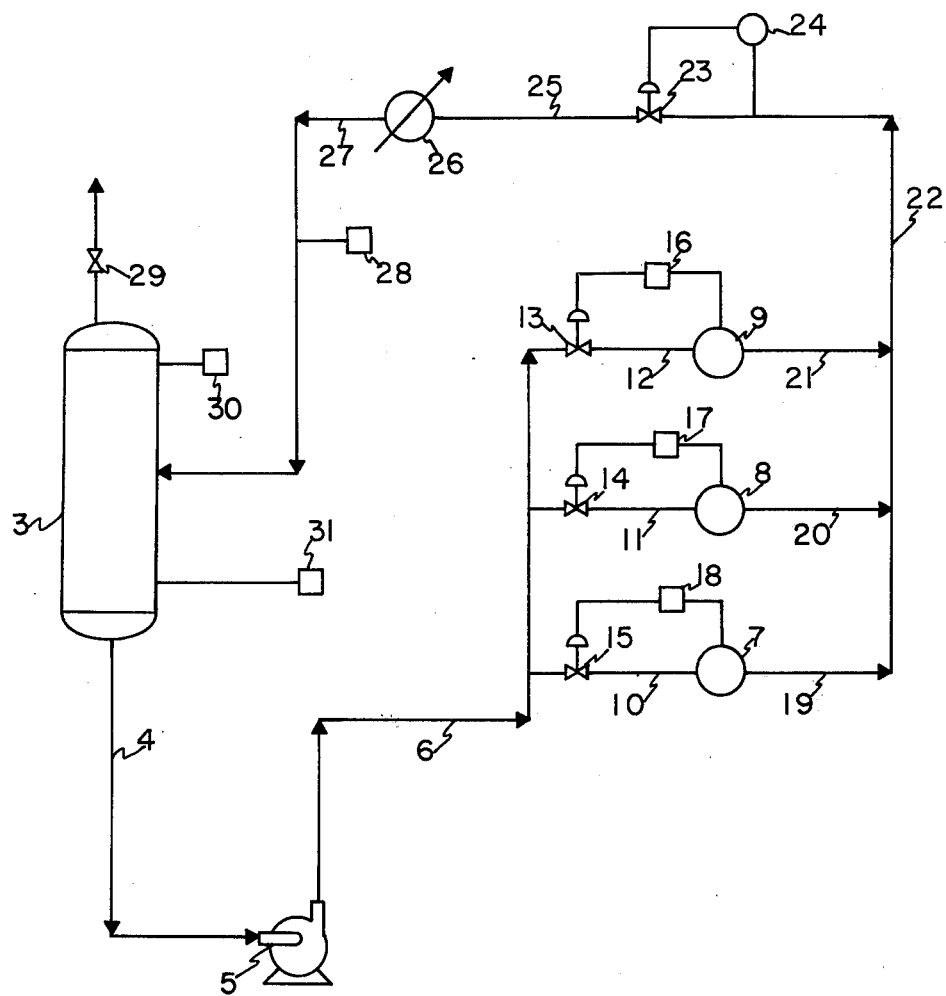
FIG. 1 is a schematic representation illustrating the method of the present invention as applied to above ambient temperature cooling.

The utility of the present invention resides in the capacity to provide cooling at above ambient temperatures either in an embodiment solely for the purpose or, alternatively, in conjunction with the simultaneous provision of cooling to below ambient temperatures, with markedly enhanced safety characteristics over conventional systems and at comparable or lesser cost.

In systems utilizing the invention wherein both above and below ambient temperature cooling are provided, the preferred embodiment of the invention comprises a single unit or integrated system with separate zones wherein the respective cooling temperatures are provided. In such a system both zones employ a common refrigerant and are served by a common condensing means and refrigeration reservoir. The temperature level required in the above ambient cooling zone is attained by vaporization of the liquid refrigerant. The cooling temperature achieved in the above ambient temperature cooling zone is dependent upon the cooling temperature in the condensing means and the pressure maintained on the vaporizing liquid.

Collaterally, once above ambient cooling has been provided by refrigerant vaporization, the pressure, and consequently the temperature, of the refrigerant vapor can rise somewhat, due to flow restraint and back pressure caused by the condenser, lines and evaporators with their attendant valves. A refrigerant pump, preferably located between the refrigerant reservoir and the above ambient evaporation zone, can supply the necessary head to overcome this back pressure. Alternatively, elevation of the refrigerant reservoir can supply head pressure to obtain the same result.

This temperature rise is sufficient such that the vapor may be efficiently condensed against available cooling water. That is, the refrigerant vapor is at a sufficiently high pressure such that its saturation temperature is above the condensing temperature of available cooling water without the need of a compression cycle to add heat of compression. Accordingly, the vapor is condensed against water, without mechanical compression, and returned to the accumulation reservoir at a suitable temperature and pressure for containing the above ambient cooling cycle. The condensing capability is dependent upon the temperature of available water. The condensing temperature will be slightly below the lowest temperature at which the system can provide above ambient cooling since the refrigerant vapor effluent from the above ambient evaporation zone must always exceed the condensing water temperature in order for condensation to occur.

The below ambient cooling zone of this embodiment receives refrigerant from the common reservoir and utilizes compressor suction and appropriate conventional valve means to create sufficiently low refrigerant pressure within an evaporation zone such that the desired below ambient temperature is achieved. In response to compressor suction, vaporized refrigerant is next drawn through an entrainment separator or knock-out drum to assure that no liquid refrigerant reaches the compressor, and then compressed and passed to the common condenser. Together with the refrigerant vapor from the above ambient cooling zone which was not mechanically compressed, the compressed refrigerant vapor from the below ambient region is then condensed against water in the common condenser and returned to the accumulation reservoir at a temperature and pressure suitable for operation of the above ambient cooling cycle.

In applications where only cooling at above ambient levels is required, that portion of the embodiment described above, including the low temperature evaporator and attendant valves and the entrainment separator and compressor are not required. In such applications, the embodiment functions as a refrigerant loop, preferably comprising a refrigerant reservoir, pump, evaporation zone and condenser, all properly interconnected, as will be apparent from the description of the specific embodiments shown in the drawings.

The above ambient cooling method of the invention is equally adaptable to situations where the desired above ambient cooling temperature may fluctuate with the temperature of the condensing water and those where it is a critical factor and must remain constant. In the situation where great precision of temperature maintenance in the above ambient range is not indicated, the method proceeds without direct pressure control means. That is, while the aforementioned backpressure caused by the evaporation zone, lines and condenser provides a slight pressure and consequent temperature increase in the refrigerant, the evaporation zone is equipped only with refrigerant level control valve means and no positive pressure control means. Thus the cooling temperature provided is wholly dependent upon the temperature of the cooling water in the condenser and will fluctuate accordingly. While this is permissible in certain processes, others will favor more precise above ambient temperature control. Where this is desired, a pressure controller may be inserted in the conduit between the above ambient evaporation zone and the condenser. This permits precise pressure control within the evaporation zone and consequent precise cooling temperature control. Thus, while the lowest temperature at which cooling may be provided will be determined by the condensing water temperature, cooling to a somewhat higher and precisely determined temperature may be provided. Means for controlling condensing pressure such as cooling water flow control or condenser tube flooding and the like can also be employed to accomplish the same result.

The method of the invention can be practiced effectively in a variety of process operations which require cooling at above ambient temperatures. The method can be practiced most effectively in connection with such processes which achieve temperatures up to about 150° C. In this capacity the invention provides a method whereby chemical processes which employ water sensitive reactants can be carried out safely. In addition to personnel safety considerations, corrosion of plant facilities by the reaction of cooling water with chemical process constituents is eliminated by removal of water from the reaction cooling stages.

Thus, the invention affords greater useful life to cooling system components while introducing the convenience and economy of greater predictability in planning for equipment downtime for repairs, cleaning, etc.

Referring to FIG. 1, which represents an embodiment of the invention applied to above ambient cooling only, liquid refrigerant is stored in refrigerant reservoir 3 at a temperature and pressure suitable for vaporization and consequent maintenance of the desired temperature level of above ambient cooling in evaporators 7, 8, and 9. The liquid refrigerant passes through line 4 to pump 5 which is preferably a centrifugal type pump. The refrigerant is pumped through line 6 to supply evaporators 7, 8, and 9 via lines 10, 11, and 12, respectively. The refrigerant level in evaporator 7 is regulated by valve 15 and level controller 18 while the level in evaporator 8 is regulated by valve 14 and level controller 17 and that in evaporator 9 by valve 13 and level controller 16. The pressure of the refrigerant as it enters evaporators 7, 8, and 9 is such that its saturation temperature is slightly below the desired level of above ambient cooling. The refrigerant is vaporized by absorption of heat from the materials to be cooled and the vapor is removed from the evaporators by way of lines 19, 20, and 21 and passes thence through line 22 to valve 23 and pressure controller 24.

If the particular cooling operation being performed by the method of the invention does not require precise fixation of above ambient temperature level, or if the lowest level of cooling attainable with existing condenser water is desired, then valve 23 and pressure controller 24 are not operable in the system. In this situation the refrigerant vapor passes unimpeded through valve 23 and continues by way of line 25 to condenser 26. Back pressure caused by flow restraint which the refrigerant encounters as a result of the condenser, lines and the evaporators and valves has decreased its pressure and temperature. Condensation of the vapor takes place in condenser 26 which utilizes available cooling water. It will be seen that in this manner practicing the invention the level of above ambient cooling which the system provides will fluctuate with the temperature of the condenser cooling water.

If the ambient cooling temperature level must be maintained at a specific level somewhat above the lowest temperature of the condenser cooling water, then valve 23 and pressure controller 24 are utilized to create a pressure between valve 23 and pump 5 which is greater than exists when valve 23 and pressure controller 24 are not operable. This fixed higher pressure level in the evaporators 7, 8, and 9 causes the refrigerant to vaporize at a higher temperature and consequently to provide above ambient cooling at a fixed higher temperature.

Whether fixed or fluctuating temperature maintenance is practiced, refrigerant vapor in line 25 is passed to condenser 26 where it is condensed against cooling water, its temperature and vapor pressure thereby being reduced. This reduced temperature, and resulting reduced vapor pressure, are determined by the condenser water temperature and are suitable for recirculation of the refrigerant through the system and provision of above ambient cooling by evaporation in evaporators 7, 8, and 9. The condensed refrigerant passes from condenser 26 through line 27, containing temperature recorder 28, to refrigerant reservoir 3 which is vented by valve 29 and monitored by pressure indicator 30 and level indicator 31.

A wide variety of refrigerants may be used effectively in carrying out the method of the invention and conventional determinants will indicate a favorable selection for a given cooling operation. A few examples of refrigerants which may be used are: ethyl chloride ($C_2H_5Cl$); methyl chloride ($CH_3Cl$); ammonia ($NH_3$); sulfur dioxide ($So_2$); dichlorodifluoromethane ($CCl_2F_2$); trichlorofluoromethane ($CCl_3F$); dichlorofluoromethane ($CHCl_2F$); dichlorotetrafluoroethane ($C_2Cl_2F_4$); propane ($C_3H_8$), and butane (normal and iso forms, $C_4H_{10}$).

Figure 2:
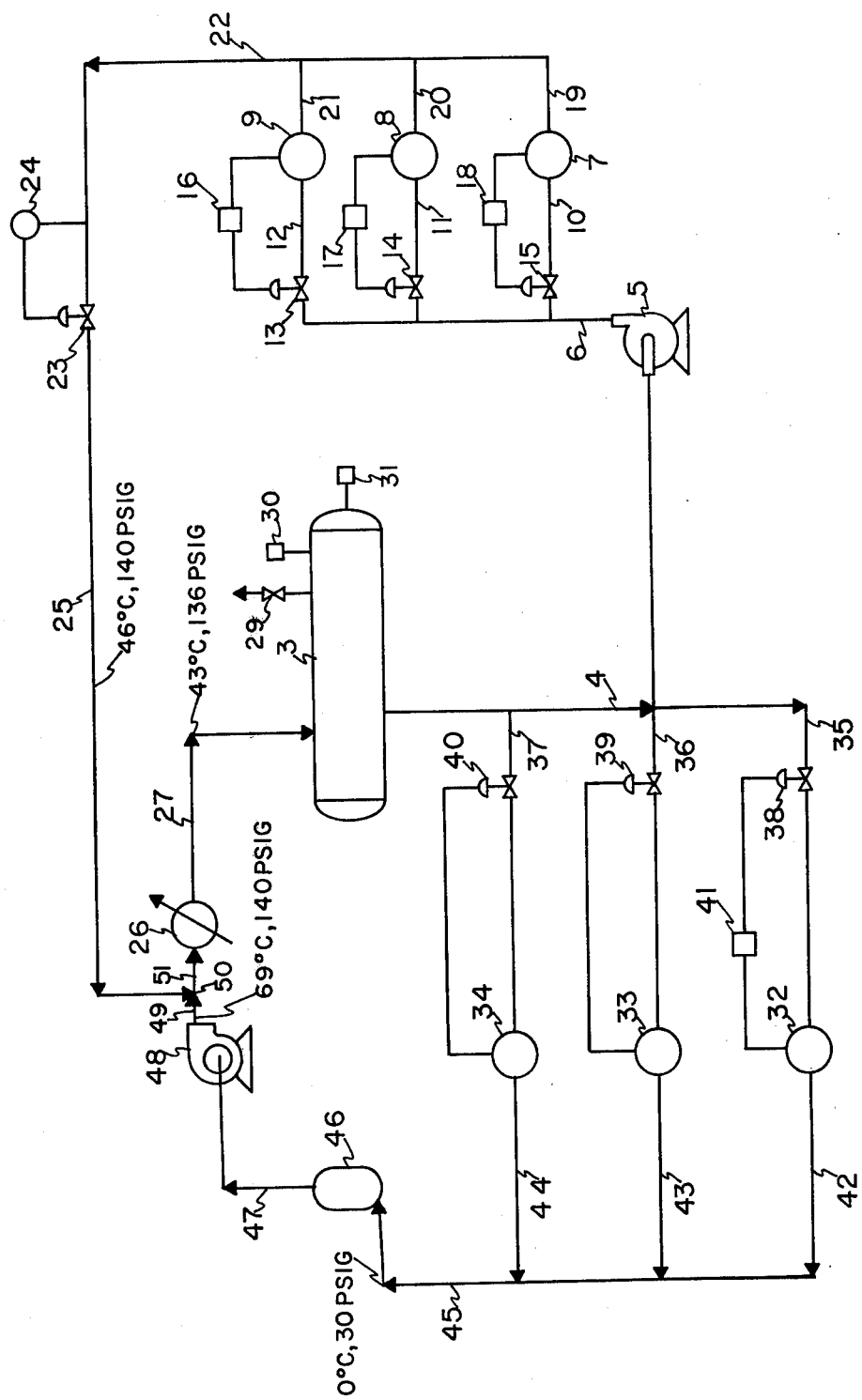
FIG. 2 is a schematic representation illustrating the method of the invention in the simultaneous provision of above and below ambient temperature cooling.

A specific example of a cooling operation utilizing the present invention is given in conjunction with the description of FIG. 2. The figure represents an embodiment whereby the invention may be practiced in simultaneously providing cooling at both above and below ambient temperature. The specific cooling operation referred to, cooling in the preparation of phosphorous oxychloride ($POCL_3$) by oxidation of phosphorous trichloride ($PCl_3$) with oxygen, is suitably representative of the advantages of the invention. With materials such as phosphorous trichloride, water leakage creates hazardous and extremely corrosive conditions. In the method of the invention water is eliminated and a preferred refrigerant for this particular operation is dichlorodifluoromethane.

The embodiment of FIG. 2 utilizes the system described in FIG. 1 to provide cooling at above ambient temperature and additionally incorporates integrally therewith a system for the provision of below ambient temperature cooling. The respective cooling areas of this embodiment mutually utilize refrigerant, a refrigerant reservoir, condensing means and certain refrigerant transport lines.

Referring to FIG. 2, refrigerant, at a temperature and resulting pressure determined by cooling water temperature in condenser 26, passes from accumulation reservoir 3 through line 4 to pump 5 and is thence pumped, via line 6, to above ambient cooling evaporators 7, 8, and 9 by way of lines 10, 11, and 12, respectively.

The three above ambient temperature cooling services to be performed by evaporators 7, 8, and 9 in the phosphorous oxychloride preparation are respectively:
 a. to condense and subcool phosphorous trichloride in a reflux column;
 b. to condense vapor from a phosphorous trichloride-phosphorous oxychloride distillation column; and
 c. to condense and subcool the phosphorous oxychloride product.

The desired temperature maintenance for these three cooling services is approximately 43° C. This temperature, however, is not critical and may fluctuate several degrees up or down without any negative influence on the operation.

The refrigerant level in evaporator 7 is controlled by valve 15 and level controller 18 while the level in evaporator 8 is regulated by valve 14 and level controller 17 and that in evaporator 9 by valve 13 and level controller 16. Refrigerant is vaporized in the evaporators providing above ambient cooling to the three services in the preparation and the vapor exits via lines 19, 20, and 21 and passes through line 22 to valve 23 and pressure controller 24.

As indicated in the description of FIG. 1, when the above ambient cooling operation being performed does not require strict maintenance of a fixed temperature, valve 23 and pressure controller 24 remain inoperable in the system. This is the case in the services receiving above ambient cooling in the phosphorous oxychloride preparation and the above ambient cooling temperature is accordingly left free to fluctuate with the temperature of condenser cooling water. Were it desired to fix the above ambient cooling temperature at a specific level above that of the cooling water, valve 23 and pressure controller 24 could be employed to supply fixed higher refrigerant pressure in the evaporators and thereby achieve that objective.

Refrigerant vapor passes through lines 25 and 51 to condenser 26 where it is at approximately 46° C. and 140 psig.

Since the condenser cooling water temperature in condenser 26 is somewhat below 43° C., efficient condensation of the higher temperature refrigerant vapor occurs and liquid refrigerant at approximately 43° C and 136 psig passes from condenser 26 through line 27 to refrigerant reservoir 3 which is vented by valve 29 and monitored by pressure indicator 30 and level indicator 31. The refrigerant, at this temperature and pressure, is suitable for recirculation through the above ambient cooling services.

Simultaneously, liquid refrigerant passing from refrigerant reservoir 3 through line 4 supplies the below ambient cooling evaporators 32, 33, and 34 via lines 35, 36, and 37, respectively.

The three below ambient cooling services to be performed by evaporators 32, 33, and 34 are respectively:
 a. to cool the phosphorous trichloride being fed to the phosphorous oxychloride reactor;
 b. to cool the phosphorous oxychloride reactor; and
 c. to cool the oxygen vent to minimize phosphorous trichloride-phosphorous oxychloride carryover.

The desired temperature maintenance for these three services is 0° C. Evaporators 33 and 34 are respectively equipped with refrigerant expansion valves 39 and 40 and evaporator 32 utilizes expansion valve 38 in conjunction with temperature-recorder-controller 41.

Compressor suction supplied by compressor 48, together with the evaporator expansion valves, creates a sufficiently low pressure in the evaporators such that the refrigerant vaporizes and provides cooling at 0° C. Refrigerant vapor then passes from evaporators 32, 33, and 34 by way of lines 42, 43, and 44, respectively, and through line 45 to knock out drum 46. In line 45 the refrigerant vapor is at 0° C. and 30 psig. The knock out drum assures that no liquid refrigerant enters the suction side of compressor 48. The vapor then passes through line 47 to compressor 48 where it is compressed to a pressure of 140 psig and attains a temperature of about 69° C.

At this temperature and pressure the vapor passes from compressor 48 through line 49 which joins line 25, conducting refrigerant vapor from the above ambient cooling side of the system, at junction 50. The commingled vapors then pass through line 51 to common condenser 26 and are condensed to liquid against cooling water to approximately 43° C. and 136 psig. The liquid condenser effluent then passes through line 27 to refrigerant reservoir 3 at this temperature and pressure, appropriate for evaporation and provision of cooling in the above ambient temperature evaporators 7, 8, and 9.

The invention provides a water-free method of above ambient cooling, with or without simultaneous below ambient cooling, thereby eliminating the hazards and corrosion problems frequently inherent in using water cooling.

Also, the practice of the invention is economically favorable since the embodiments utilized minimize plant expenditure and, as with water cooling, no compression capacity is required in above ambient services.

What is claimed is:

1. A method of providing cooling at above ambient temperature comprising, in a closed system having an evaporation zone, providing a supply of liquid refrigerant suitable to obtain a first variable temperature level of above ambient cooling, passing said refrigerant from said supply through said evaporation zone, condensing effluent vapor from said evaporation zone at a second variable temperature level of an available cooling medium and returning said condensed refrigerant to said supply, while maintaining said first variable temperature level constant at a level above said second variable temperature of the available cooling medium.

2. The method of claim 1 in which the refrigerant is selected from a group consisting of ammonia, ethyl chloride, methyl chloride, sulfur dioxide, dichlorodifluoromethane, trichlorofluoromethane, dichlorofluoromethane, 1,2-dichloro-1, 1,2,2-tetrafluoroethane, 1,1-dichloro-1,2,2,2-tetrafluoroethane, propane, butane, and isobutane.

3. A method of providing cooling at both above and below ambient temperature comprising, in a closed system having respective evaporation zones, providing a supply of liquid refrigerant suitable to obtain a first variable temperature level of above ambient cooling in one evaporation zone, passing said refrigerant from said supply through said evaporation zone, condensing effluent vapor from said evaporation zone at a second variable temperature level of an available cooling medium and returning said condensed refrigerant to said supply while simultaneously circulating refrigerant through another evaporation zone containing expansion means, in response to compressor suction, thereby reducing pressure in said other evaporation zone sufficiently to obtain a desired temperature level of below ambient cooling, compressing and condensing the refrigerant vapor at said second variable temperature level of the available cooling medium required by the above ambient evaporation zone and returning said refrigerant to said supply.

4. The method of claim 3 in which the refrigerant is selected from a group consisting of ammonia, ethyl chloride, methyl chloride, sulfur dioxide, dichlorodifluoromethane, trichlorofluoromethane, dichlorofluoromethane, 1,2-dichloro-1,1,2,2-tetrafluoroethane, 1,1-dichloro-1,2,2,2-tetrafluoroethane, propane, butane and isobutane.

5. The method of claim 3 wherein said first variable temperature level is maintained constant at a level above said second variable temperature level of the available cooling medium.

6. The method of claim 5 in which the refrigerant is selected from a group consisting of ammonia, ethyl chloride, methyl chloride, sulfur dioxide, dichlorodifluoromethane, trichlorofluoromethane, dichlorofluoromethane, 1,2-dichloro-1,1,2,2-tetrafluoroethane, 1,1-dichloro-1,2,2,2-tetrafluoroethane, propane, butane and isobutane.

7. In the preparation of phosphorus oxychloride by oxidation of phosphorus trichloride with oxygen, the method of providing cooling at both above and below ambient temperature comprising, in a closed system having respective evaporation zones, providing a supply of liquid refrigerant suitable to obtain a first variable temperature level of above ambient cooling in certain evaporation zones, passing said refrigerant from said supply through said evaporation zones, condensing effluent vapor from said evaporation zones at a second variable temperature level of an available cooling medium and returning said condensed refrigerant to said supply while simultaneously circulating refrigerant through other evaporation zones containing expansion means, in response to compressor suction, thereby reducing pressure is said other evaporation zones sufficiently to obtain a desired temperature level of below ambient cooling, compressing and condensing the refrigerant vapor at said second variable temperature level of the available cooling medium required by the above ambient evaporation zones and returning said refrigerant to said supply.

8. The method of claim 7 in which the refrigerant is selected from a group consisting of ammonia, ethyl chloride, methyl chloride, sulfur dioxide, dichlorodifluoromethane, trichlorofluoromethane, dichlorofluoromethane, 1,2-dichloro-1,1,2,2-tetrafluoroethane, 1,1-dichloro-1,2,2,2-tetrafluoroethane, propane, butane and isobutane.

* * * * *